(12) United States Patent
Sunnell et al.

(10) Patent No.: US 7,733,782 B2
(45) Date of Patent: Jun. 8, 2010

(54) METHOD AND AN ARRANGEMENT FOR AVOIDING UNNECESSARY RETRANSMISSIONS

(75) Inventors: Karl-Erik Sunnell, Sollentuuna (SE); Mathias Cramby, Sollentuna (SE); Per Beming, Stockholm (SE); Stefan Parkvall, Stockholm (SE); Göran Malmgren, Hägersten (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 261 days.

(21) Appl. No.: 11/547,494

(22) PCT Filed: Mar. 31, 2004

(86) PCT No.: PCT/SE2004/000499

§ 371 (c)(1),
(2), (4) Date: Oct. 2, 2006

(87) PCT Pub. No.: WO2005/096570

PCT Pub. Date: Oct. 13, 2005

(65) Prior Publication Data

US 2007/0159985 A1 Jul. 12, 2007

(51) Int. Cl.
*H04L 1/00* (2006.01)
(52) U.S. Cl. .................. 370/236; 455/500
(58) Field of Classification Search .......... 370/229, 370/236, 310, 469; 714/748, 776
See application file for complete search history.

(56) References Cited

U.S. PATENT DOCUMENTS

| | | | | |
|---|---|---|---|---|
| 6,760,860 | B1 * | 7/2004 | Fong et al. | 714/4 |
| 2001/0032325 | A1 * | 10/2001 | Fong et al. | 714/18 |
| 2002/0108082 | A1 * | 8/2002 | McDonnell | 714/748 |
| 2002/0118639 | A1 * | 8/2002 | Chintada et al. | 370/230 |
| 2005/0138528 | A1 * | 6/2005 | Ameigeiras et al. | 714/774 |

FOREIGN PATENT DOCUMENTS

| | | | |
|---|---|---|---|
| EP | 1 089 506 A2 | | 4/2001 |
| EP | 1 204 249 A1 | | 5/2002 |
| EP | 1204249 A1 | * | 5/2002 |
| WO | 01/80476 A1 | | 10/2001 |
| WO | 02/069547 A1 | | 9/2002 |

OTHER PUBLICATIONS

International Preliminary Report on Patentability mailed Jul. 13, 2006 in corresponding PCT application PCT/SE2004/000499.
International Search Report mailed Nov. 11, 2004 in corresponding PCT application PCTSE2004/000499.

(Continued)

*Primary Examiner*—Huy D Vu
*Assistant Examiner*—James P Duffy
(74) *Attorney, Agent, or Firm*—Nixon & Vanderhye P.C.

(57) ABSTRACT

A method and an arrangement for avoiding unnecessary retransmissions in a packet-based radio-communication network by exchanging transmission state information between retransmission functionality entities (12, 21) located at respective protocol layers in different network nodes (1, 2), and performing inter-layer coordination of retransmissions between the network nodes (1, 2) based on the exchanged transmission state information to provide a more efficient overall scheme for retransmissions.

11 Claims, 13 Drawing Sheets

OTHER PUBLICATIONS

Reiner Ludwig et al., "The Eifel Algorithm: Making TCP Robust Against Spurious Retransmissions", 7 pages.
R. Ludwig et al., "The Eifel Detection Algorithm for TCP rfc3522.txt", 13 pages.
Lars-Åke Larzon et al., "Hints and Notifications", pp. 635-641.
Douglas E. Comer, "Internetworking with TCP/IP, Volume I: Principles, Protocols and Architecture", Second Edition, Prentice-Hall International Editions, 1991, ISBN 0-13-47-4321-0.
3GPP TR 25.896 V0.4.1, $3^{rd}$ Generation Partnership Project; Technical Specification Group Radio Access Network; Feasibility Study for Enhanced Uplink for UTRA FDD; Release 6, Aug. 2003, 54 pages.
3GPP TS 25.322 V5.13.0, $3^{rd}$ Generation Partnership Project; Technical Specification Group Radio Access Network; Radio Link Control (RLC) protocol specification; Release 5, Dec. 2005, 78 pages.
3GPP TS 25.308 V6.3.0, $3^{rd}$ Generation Partnership Project; Technical Specification Group Radio Access Network; High Speed Downlink Packet Access (HSDPA) Overall description; Stage 2; Release 6, Dec. 2004, 28 pages.

* cited by examiner

METHOD AND AN ARRANGEMENT FOR AVOIDING UNNECESSARY RETRANSMISSIONS

This application is the US national phase of international application PCT/SE2004/090499 filed 31 Mar. 2004, which designated the U.S., the entire contents of which is hereby incorporated by reference.

TECHNICAL FIELD

The presently disclosed technology relates to radio communication systems in general, and in particular relates to a method and an arrangement for avoiding unnecessary retransmissions in a packet based radio communication system.

BACKGROUND

In radio communication systems, powerful error control methods can be useful. One attractive error control technique is the class of so called Automatic Repeat reQuest (ARQ) protocols that can ensure reliable information transfer even over extremely noisy channels. The main principle is that a receiving side can request retransmissions of corrupted and/or missing data units from a transmitting side by sending a status reports through a return channel.

In order to improve the reliability of the error control system, multiple retransmission schemes can be overlaid at different protocol layers (see FIG. 1). Such an approach is possible e.g. in the evolved WCDMA standard [1] where a lower (Medium Access Control or MAC) layer retransmission scheme corrects actual radio channel errors whereas an upper (Radio Link Control) protocol layer retransmission scheme ensures recovery from lower layer protocol failures.

In multi-user communication systems, such as cellular radio systems, ARQ protocols are typically used for packet data services (or best-effort services), which means that there can typically be:

- retransmission functionalities on the transport level in order to guarantee reliable end-to-end communication, and
- retransmission functionalities on the sub-layer(s) of the data link protocol layer to facilitate reliable information transfer over the radio link.

One of the most important factors for the overall system performance is that these overlaid retransmission protocols usually operate differently. Indeed, lower layer retransmissions can be significantly faster than those of the upper layer. Furthermore, the actual retransmission requests can be triggered in many different ways. Usually, lower layer retransmissions are based on the outcome from the decoding process in a fairly straightforward manner, e.g. as specified in [1]. In turn, upper layer retransmissions can be based on some observations of (somewhat more diffuse and) indirect failure events such as out-of-order data units, e.g. as specified in [2] and abrupt variations in the round trip time, e.g. as used in [3].

In general, the possible (retransmission request) triggering events such as sudden changes in the Internet traffic and failed cyclic redundancy check (in the radio interface) are not related in a simple and easily observable manner. A problem of unnecessary retransmissions therefore arises, since multiple retransmission schemes (that are driven by different triggering events) operate independently of each other and therefore may request retransmissions of exactly the same data unit, which impairs the overall protocol efficiency.

In addition, the transport layer retransmission protocol and the (transport layer) flow control mechanism are closely related to each other. Consequently, another problem arises, since the link layer retransmissions may interact with the transport layer retransmissions, which in turn may negatively influence the transport layer flow control, i.e. unnecessarily throttle the data flow. Consequently, coordination of hierarchical retransmission protocols is important.

Schemes for coordination of hierarchical retransmission protocols have been proposed (and standardized) both for the data link layer and for the transport layer. As already mentioned, an important difference between the different layers is that the transport layer protocol is closely related to the (transport layer) flow control mechanism, which is not the case for the link layer. Thus, coordination methods for the different levels are also dissimilar.

Link Layer Schemes

In the link layer, coordination schemes are used to influence and control the retransmission triggering at different sub-layers (of the data link protocol layer). The goal of the coordination is to avoid unnecessary retransmissions from the overlaid link layer retransmission schemes. Since the receiving side normally triggers the link layer retransmissions, the coordination schemes are placed between the different sub-layers in the receiving side as shown in FIG. 2.

The coordination scheme receives data units from the receiving lower layer entity and further delivers the data units to the receiving upper layer entity. The delivery of subsequent data units to upper layers is delayed until all preceding data units have either been successfully received, possibly after some retransmissions in the lower layer, or the lower layer ARQ entity has decided not to perform any further attempts on the missing data units.

In [4], a timer-based coordination scheme is proposed where the upper layer retransmission requests are delayed for some (usually fixed) delay period that corresponds to the error recovery operation (or the round trip time) at the lower layer.

In [5], a method is described where the data units are delayed by using an algorithm that prevents multiple retransmission requests from different protocol layers until a lower protocol layer failure occurs. If a lower layer protocol failure is detected, it is reported to the upper protocol layer; otherwise, transport error information is received and calculated by the lower layer.

In some existing radio system standards, coordination schemes are already used for the sake of unnecessary link layer retransmission avoidance. In the evolved WCDMA standard [1], e.g. timer-based coordination schemes are used between the medium access control (MAC) and radio link control (RLC) protocol sub-layers.

In the above-mentioned scheme, a list of data units is maintained by using the principle of sliding window. Individual MAC protocol data units are therefore provided with unique sequence numbers. If a data unit with a MAC sequence number higher than the leading edge of the window is received, that data unit is inserted to the position indicated by the sequence number. The window is expanded such that the data unit forms the last data unit in the window. Any data units outside of the window after the window advancement are delivered to the upper layer.

The trailing edge of the window is assigned to the lowest sequence number of those data units that are missing, i.e. those data units that should be received after some retransmissions. A stalling-avoidance timer that is started as soon as a data unit is found to be missing controls the trailing edge of the window. If the missing data unit is not received before the stalling-avoidance timer expires, the data unit is considered to be lost and the coordination scheme advances the window such that the lost data unit is left outside of the sliding window.

Transport Layer Schemes

Similar to link layer protocols, the transport layer retransmissions are based on the feedback from the receiving side but the receiving side typically does not trigger them. It is the transmitting side that actually makes the final retransmission triggering decision by reacting on the feedback. Moreover, the transmitting side controls the data flow by changing the size of the transmitter window in such a way that the window becomes smaller, i.e. the transmission rate is reduced, whenever retransmissions are triggered.

If link layer retransmission protocols are used, the operation of transport layer retransmission protocols can be negatively influenced by some ambiguities. It may happen that both the data transport and the feedback is delayed due to several and sudden data link layer retransmissions. The transmitting side of the transport layer retransmission protocol can further mistakenly interpret this as (congestion or) data loss and retransmissions may be unnecessarily triggered. Unnecessary or spurious retransmissions are undesirable since the triggered retransmissions means that the flow control scheme shrinks the transmission window and thus spurious retransmissions also unnecessarily decrease the transmission rate.

In [6], a scheme referred to as the Eifel detection algorithm is proposed in order to make the Transmission Control Protocol (TCP) robust against spurious retransmissions. The main idea is to eliminate the retransmission ambiguity and then restore the load (state of the transmission window) and resume transmission (after detected spurious retransmissions) with the next unsent segment. The Eifel detection algorithm is included in the TCP standard [7].

In [8], an inter-layer communication scheme is proposed that is based on so-called hints and notifications that can also help the problem of ambiguities. The purpose of the hints is to provide a generic mechanism to propagate some information about error-insensitive payloads from the upper layer to lower layers. The link layer can make use of this information whenever it chooses modulation, error correction and verification mechanisms on per-data unit basis. In turn, the notifications provide a mechanism to inform sources of why some of the data units are dropped. It can also inform sources about long packet delays caused by local retransmissions.

The hints and notifications approach has been proposed for the Internet architecture but—unlike the Eifel detection algorithm—it is not included in the standard

SUMMARY

An illustrative non-limiting aspect of the disclosure provides an improved method of avoiding unnecessary retransmissions in packet-based radio communication systems.

Another non-limiting illustrative aspect provides a proactive method of avoiding unnecessary retransmissions in a packet-based radio communication system.

Yet another non-limiting illustrative aspect provides a method for coordinating hierarchical retransmission protocols between different protocol layers and/or different network nodes.

Another non-limiting illustrative aspect provides a method that reduces the delay of delivery of data units.

A further non-limiting illustrative aspect provides a method of avoiding unnecessary retransmissions for a multi-hop radio communication system.

A non-limiting illustrative aspect provides a method of avoiding unnecessary retransmissions for a radio communications system comprising a plurality of receiving nodes.

Other non-limiting illustrative aspect provides a system, a node and a retransmission functional entity enabling avoidance of unnecessary retransmissions in a packet-based radio communication system.

Conventional avoidance schemes are aimed mainly for cases where only a single (radio) receiver may decode the data unit and moreover the (overlaid) receiving ARQ entities or retransmission functional entities are assumed to be located in the same network node. However, in some radio communication systems, it can be very useful to have multiple receiving nodes. It can be also beneficial to transfer the data through parallel and multiple paths. Consequently, there can be architectures of hierarchical retransmission protocols or entities that are located in different protocol layers and that can be further terminated in completely different network nodes. This gives rise to a new degree of complexity of the retransmission mechanisms and brings with it a number of associated problems.

A basic idea according to an illustrative non-limiting aspect is to exchange transmission state information between retransmission functionality entities located at respective protocol layers in different network nodes, and perform inter-layer coordination of retransmissions between the network nodes based on the exchanged transmission state information to provide a more efficient overall scheme for retransmissions.

The inter-layer communication may involve:

receiving protocol entities at different protocol layers and different network nodes that exchange some protocol state information with each other, and/or transmitting protocol entities at different protocol layers and different network nodes that exchange some protocol state information with each other.

A similar kind of information exchange mechanism can be typically used for both receiving and transmitting sides. In a non-limiting illustrative embodiment, both the lower layer entities and the upper layer entities use a sliding window approach. Moreover, according to a non-limiting illustrative specific embodiment, the ARQ window state can be represented as a protocol primitive that indicates the trailing and leading edges of the window.

A non-limiting illustrative embodiment comprises exchanging transmission state information between a transmitting upper layer retransmission functional entity located at a first node and a transmitting lower layer retransmission functional entity located at a second node, whereby the retransmissions from the two layers are coordinated and unnecessary retransmissions are prevented.

Another non-limiting illustrative embodiment comprises exchanging transmission state information between a receiving lower layer retransmission functional entity located at a first node and a receiving upper layer retransmission functional entity located at a second node, whereby the requests for retransmissions from the two layers are coordinated and triggering of unnecessary retransmissions are prevented.

Another specific embodiment of the invention comprises exchanging transmission state information between a receiving lower layer retransmission functional entity located at a first node and a receiving upper layer retransmission functional entity located at a second node, whereby the requests for retransmissions from the two layers are coordinated and triggering of unnecessary retransmissions are prevented.

Further, a system, a node and a retransmission functional entity adapted for enabling the exchange of transmission state information and subsequent inter-layer coordination of retransmissions and/or requests for retransmissions are provided.

According to an illustrative non-limiting embodiment, the transmission state information comprises the window state of the protocol layer (transmitting or receiving) and is implemented as a protocol primitive.

Some advantages include:
Avoiding unnecessary retransmissions.
Avoiding multiple requests for retransmissions.
Improved overall radio system performance.
Improved end-user perceived quality.
Reduced delay of delivery of data packets.

BRIEF DESCRIPTION OF THE DRAWINGS

The invention, together with further objects and advantages thereof, may best be understood by reference to the following description taken together with the accompanying drawings, in which.

DETAILED DESCRIPTION

In order to provide an in-depth understanding of the technology, a detailed analysis of some of the problems with the prior art is presented below. Since the link layer and transport layer schemes are somewhat different, the problems for the different layers are presented and considered separately.

In the following description retransmission functional entities are also referred to as Automatic Repeat reQuest (ARQ). However, the scope is not limited to present day ARQ entities; instead, it is equally applicable to any retransmission functionality.

Problems with Link Layer Schemes

Conventional avoidance schemes are aimed mainly for cases where only a single (radio) receiver may decode the data unit and moreover the (overlaid) receiving ARQ entities or retransmission functional entities are assumed to be located in the same network node. However, in some radio communication systems, it can be very useful to have multiple receiving nodes. It can be also beneficial to transfer the data through parallel and multiple paths. Consequently, there can be architectures of hierarchical retransmission protocols or entities that are located in different protocol layers and that can be further terminated in completely different network nodes.

One of the possible examples is a cellular system, where reception utilizing multiple nodes is generally found to be useful. In the uplink (mobile-to-fixed) direction, lower layer ARQ entities are often proposed [9] to be located in the (receiving node or) base stations in order to facilitate fast recovery from the physical channel errors whereas the upper layer ARQ entities are typically located in the radio network controllers (RNC) (or similar nodes). Thus, in soft handover situations, there can be multiple receiving lower layer ARQ entities, one in each base station serving the user in question, while there is a single receiving upper layer ARQ entity located in the RNC (or similar node) and both a transmitting upper and lower layer entity in the mobile terminal.

Also, in so-called multi-hop radio networks several nodes surrounding some transmitting node can be simultaneously involved in the reception of the same data unit. Hence, there can be multiple receiving lower layer ARQ entities, one in each receiving node, whereas there is one single receiving upper layer ARQ entity that is placed in the destination node and a pair of transmitting upper and lower layer ARQ entities in the source node.

Figure 1:
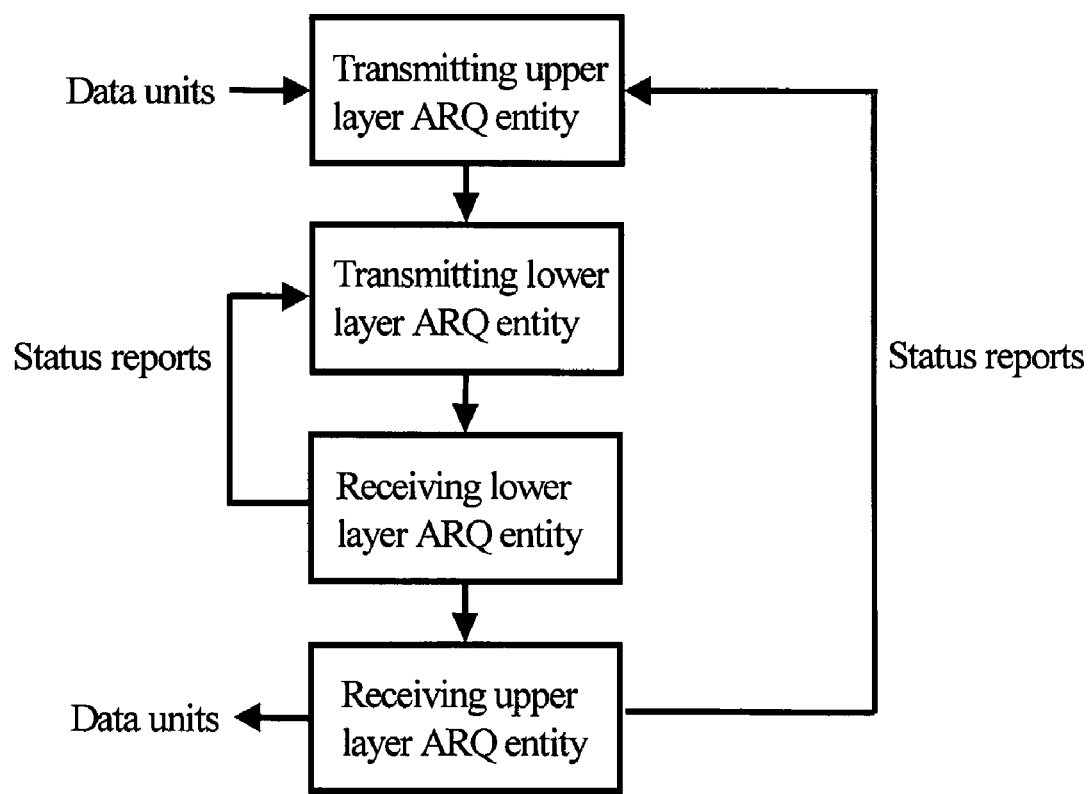
FIG. 1 is a block diagram illustrating known ARQ schemes overlaid within protocol layers.
Figure 2:
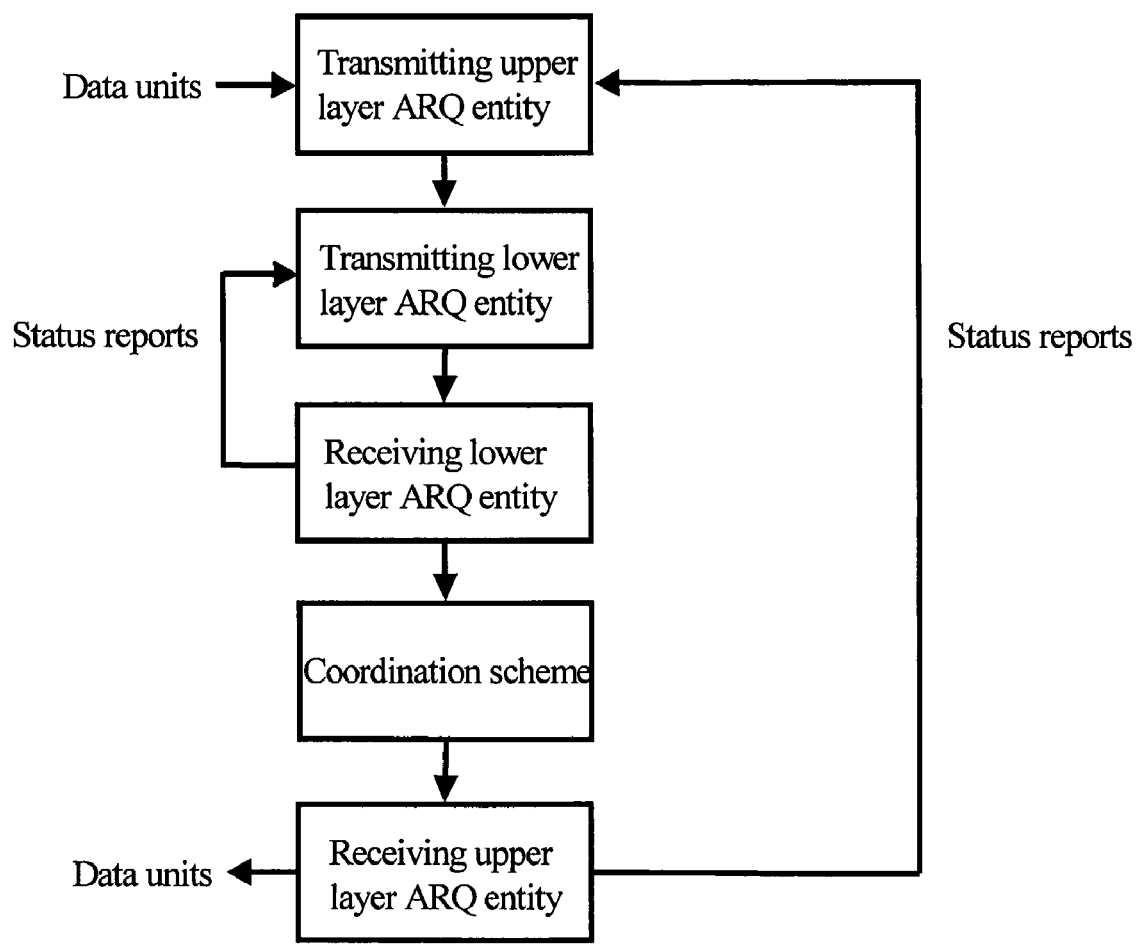
FIG. 2 is a block diagram illustrating known coordination mechanism between two receiving ARQ entities.
Figure 3:
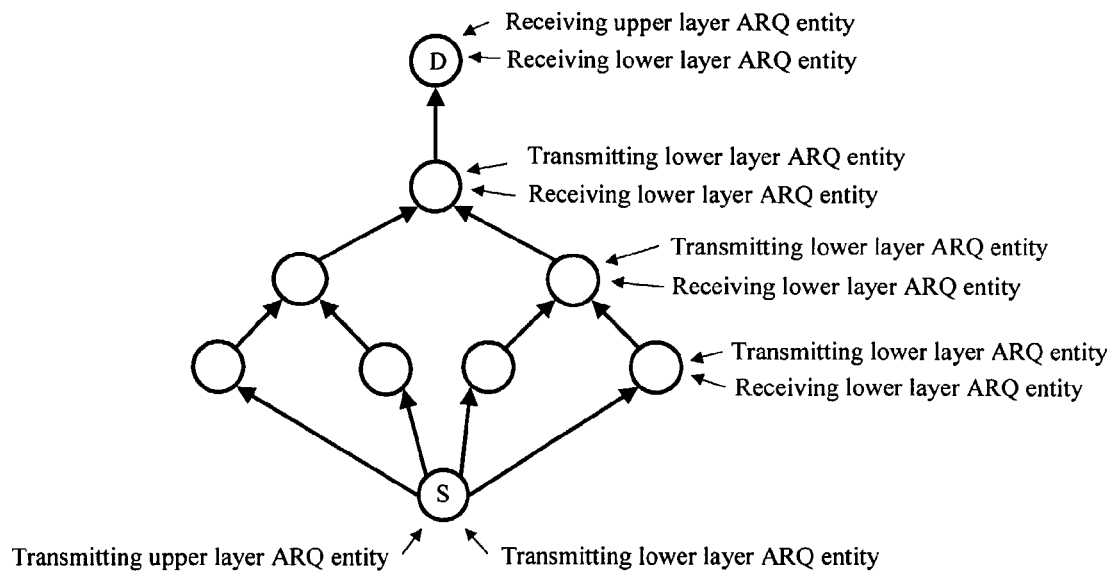
FIG. 3 illustrates a multi-hop network
Figure 4:
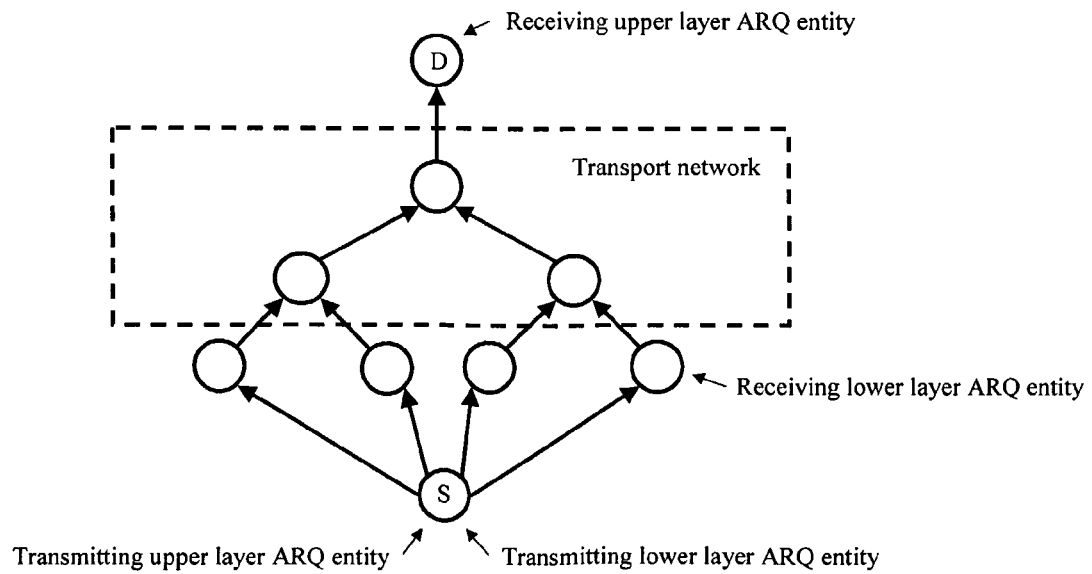
FIG. 4 illustrates a cellular systems uplink during soft-handoffs.

An example is shown in FIG. 3 where two protocol layers provide ARQ functionality in a multi-hop (or relaying) network. Similarly, the corresponding scenario for cellular systems uplink is illustrated in FIG. 4. Observe that the only elementary difference between cellular systems uplink and multi-hop (and relaying) networks is that the cellular system uses a separate transport network and therefore the number of lower layer ARQ entities and protocol termination points is smaller.

If known overlaid ARQ schemes are used for this kind of system architecture and the conventional avoidance techniques are used then the problem about the placement of unnecessary retransmission avoidance entities becomes relevant. In principle, there are several possible alternatives. Either independent functional entities are placed in the individual receiving nodes together with the receiving lower layer ARQ entities or one or several functional entities are placed in one or several nodes somewhere between the source and destination nodes. It is also possible to place a functional entity placed in the same node as the receiving higher layer ARQ entity.

If the avoidance functionality is now placed in the receiving nodes (case 1), a stalling avoidance timer is started by each lower layer entity—independently of each other—whenever they discover a missing data unit. Moreover, the delivery of subsequent data units is delayed until all preceding data units have either been successfully received or the lower layer ARQ entity has decided not to perform any further attempts on the missing data units.

A problem arises since none of the independent receiving nodes that failed to decode the data unit knows the situation for the rest of the nodes. In fact, the separate lower layer ARQ entities sometimes receives only a fraction of the transmitted data units and therefore the independent avoidance schemes cannot discover which one of the data units that is actually lost and which one of them that is successfully received by other entities. Consequently, some nodes may incorrectly consider also such data units that are successfully received by other nodes as lost ones and therefore they unnecessarily delay the data unit delivery to the upper layer.

If the avoidance functionality is not placed in the same node as the receiving lower layer ARQ entity (cases 2 and 3), the behavior of the retransmission protocol cannot be aligned with that of the avoidance mechanism. It could be useful to align the operation such that the lower layer ARQ entity (or entities) is prohibited to request retransmissions of such missing data units that the avoidance scheme has already considered as lost ones. Similarly, it could be beneficial to ensure that the lower layer ARQ entity (or entities) always requests retransmissions until the avoidance mechanism finally decides to give up, which guarantees that the system makes use of the overlaid ARQ architecture as much as possible.

It should be emphasized that although the avoidance method in [5] can indicate some lower layer protocol failures to an upper layer it can still not align the protocol behavior in the above-described manner. If several lower layer ARQ entities are indeed involved in the reception of same data unit, the upper layer may receive failure indicators from several entities. In order to make use of the failure indicators the upper layer should at any time be aware of the current protocol states of all involved lower layer entities which means that the upper layer should be somehow capable to identify the individual lower layer entities. Moreover, the upper layer should be able to send some control information back to the lower layer. It is otherwise impossible to prohibit lower layer retransmissions as soon as the avoidance scheme decides to give up lower layer transmissions. Consequently, a more elaborated information exchange method than a simple protocol failure indicator mechanism can be useful.

It can be also extremely difficult to discover whether some missing data unit is actually lost or not. In multi-hop radio networks, for example, the individual network nodes cannot exploit the benefits of reliable and (time) synchronized transport network. Furthermore, the number of hops can be unknown in advance and thus the actual instant of data unit arrival (in the destination node) may become utmost unpredictable. It can therefore also be hard to know the instant of time when all the involved lower layer entities has indeed decided not to perform any further retransmission attempts on some particular data unit. Finding a proper setting for the stalling-avoidance timer—especially for the multi-hop (and relaying) radio networks—may turn out to be a challenging engineering task.

One of the underlying assumptions in the conventional techniques—in particular [1] and [4]—is that the upper layer retransmissions are mainly unnecessary and therefore they should be avoided as much as possible. It can however be argued that at least some of the upper layer retransmissions are actually necessary. It is otherwise difficult to motivate the introduction of hierarchical retransmission functionalities. A possible shortcoming of timer-based schemes (with delayed retransmission requests and data unit delivery) is therefore that also the necessary upper layer retransmissions may be delayed, which is generally very unfortunate.

In summary, it is for example unclear how the conventional techniques can be efficiently used for such situations where several independent lower layer ARQ entities are simultaneously involved in the reception of the same data units and the functional entities are placed in different network nodes.

Problems with Transport Layer Schemes

Figure 5:
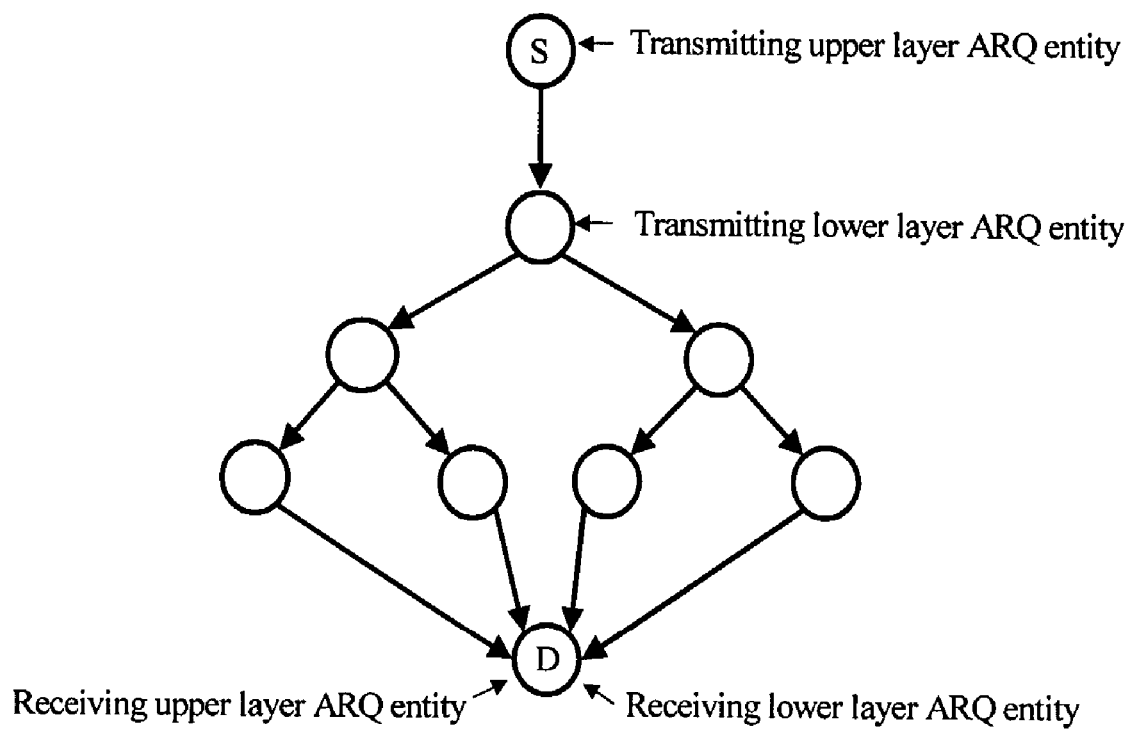
FIG. 5 illustrates a cellular systems downlink.

In this subsection, problems with the conventional transport layer schemes are described by using a system model shown in FIG. 5. In the model, an end-to-end connection is illustrated in a cellular system downlink direction. An important difference when compared to the above-discussed link layer techniques is that the transmitting ARQ entities are placed in different nodes. Now, the transmitting upper layer ARQ entity, i.e. the TCP sender, is located in the source node S whereas the transmitting lower layer ARQ entity is located in the network controller (or similar node).

One of the problems is that the signaling mechanisms are only available in the network layer, which means that the transmitting side can only make use of some information that is reported by the receiving side. In fact, both the Eifel detection algorithm and the hints & notifications scheme are based on the feedback from the destination node. It could be useful if the transmitting—both the upper and the lower layer—ARQ entities could communicate with each other and exchange some information e.g. about the discarded protocol data units. In that case, the upper layer could react faster since the transmitting lower ARQ entity can provide information faster than the receiving upper layer ARQ entity since it is located closer to the transmitting upper layer entity.

Another problem is that the conventional techniques are solely reactive which means that they aim to first detect some failure events and then react accordingly. In order to alleviate the problem of spurious retransmissions, the Eifel detection algorithm should detect at least one spurious retransmission and thus the undesired inter-layer interactions cannot be completely eliminated. In other words, it could be beneficial to introduce a proactive scheme that aims to prevent failures in advance, i.e. it should react in such a way that none of the retransmissions—including the one that needs to be detected first—becomes spurious.

The main focus of the conventional techniques has been on the issues of spurious retransmissions and TCP timeouts. Another important problem area is the TCP slow start where the transmission rate is gradually increased for the sake of Internet traffic smoothening. Similar to the problem of spurious retransmissions the upper layer may interpret the delays caused by the link layer retransmission (during the slow start) in a negative manner. Sudden and intermittent link layer retransmissions may actually prolong the slow start unnecessarily, which in turn results in poor resource utilization in the radio network and degraded end-user perceived communication quality.

Since the radio networks normally have own resource and traffic control mechanisms, TOP slow start may not actually serve any purpose in terms of radio network performance. It could be beneficial if e.g. the transmitting lower layer entity could indicate to the upper layer entity that the upper layer data segment has entered a reliable communication link. In that case, the flow control scheme could be driven by such indications (at least during the slow start) instead of waiting for the acknowledgements from the TCP receiver (that is placed in the destination node). Consequently, the slow start could become somewhat faster which is desirable.

Figure 6:
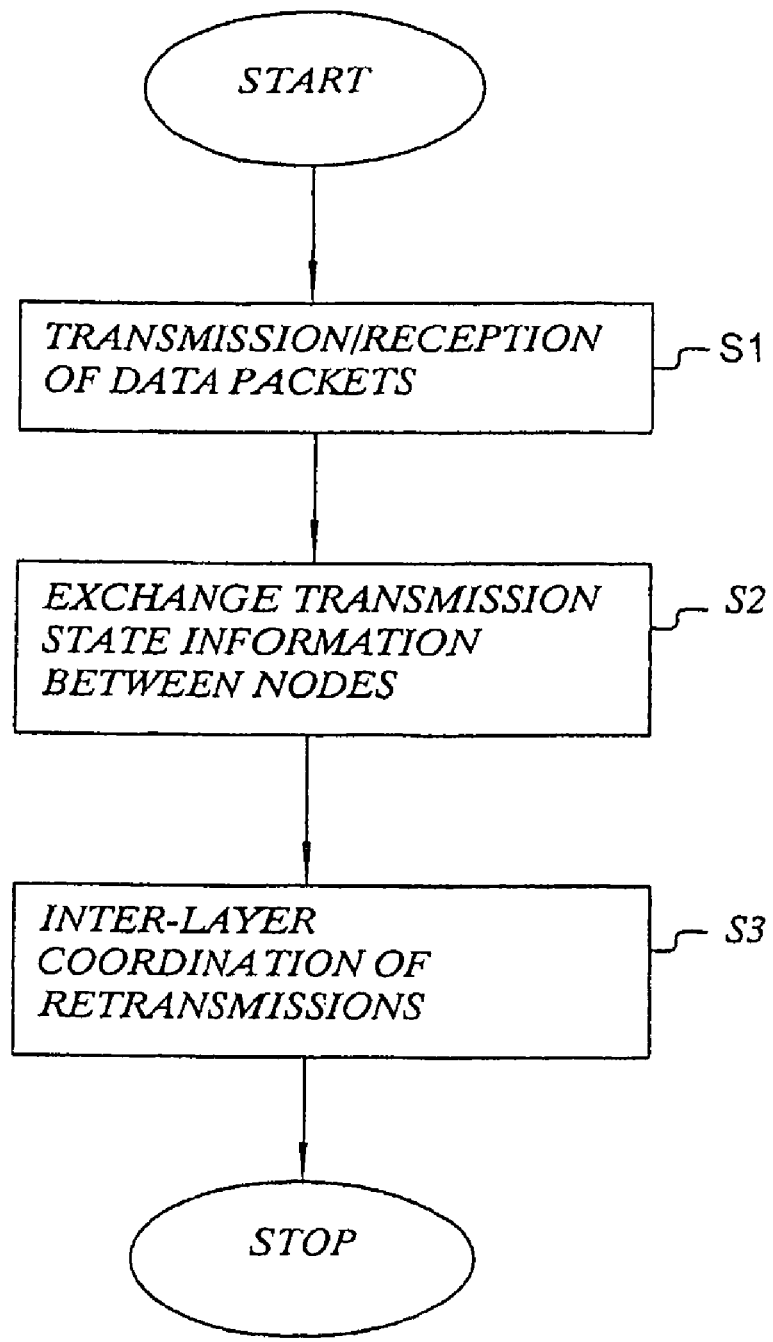
FIG. 6 is a schematic flow diagram of an illustrative non-limiting method.

An illustrative non-limiting aspect suggests inter-layer communication that can exchange some information between the transmitting ARQ entities could improve both the overall radio system performance and the end-user perceived quality, as is illustrated in FIG. 6. In the conventional techniques, such an inter-layer communication approach is not supported.

Consider the case of a first and a second protocol layer at a respective network node. Retransmission functional entities are provided at both said protocol layers. Initially, a number of sequentially numbered data packets from the first protocol layer are received at the second protocol layer in step S1 according to FIG. 6.

Subsequently, transmission state information regarding the data packets is exchanged in step S2 between the two nodes, i.e. between the two retransmission functional entities located at respective protocol layers of the nodes. The transmission state information preferably relates to the status of reception and/or transmission of the data packets.

Finally, based on the exchanged transmission state information, retransmissions and/or requests for retransmissions at the two protocol layers are coordinated in step S3 according to FIG. 6, to provide a more efficient scheme for retransmissions.

The transmission state information basically provides information regarding at least sequence numbers for data packets or data units not yet successfully received or transmitted.

In the following, non-limiting exemplary embodiments for a TX-oriented and a RX-oriented scheme will be described. Since the implementation of the method is slightly different for a transmitter-oriented or a receiver-oriented coordination scheme, the two cases will be discussed separately. However, the basic aspect of exchanging transmission state information can be more or less the same. For some cases the exchange is one-way, for other cases it is an actual two-way exchange, i.e. the term exchange is used to imply both one-way and two-way communication.

Figure 7:
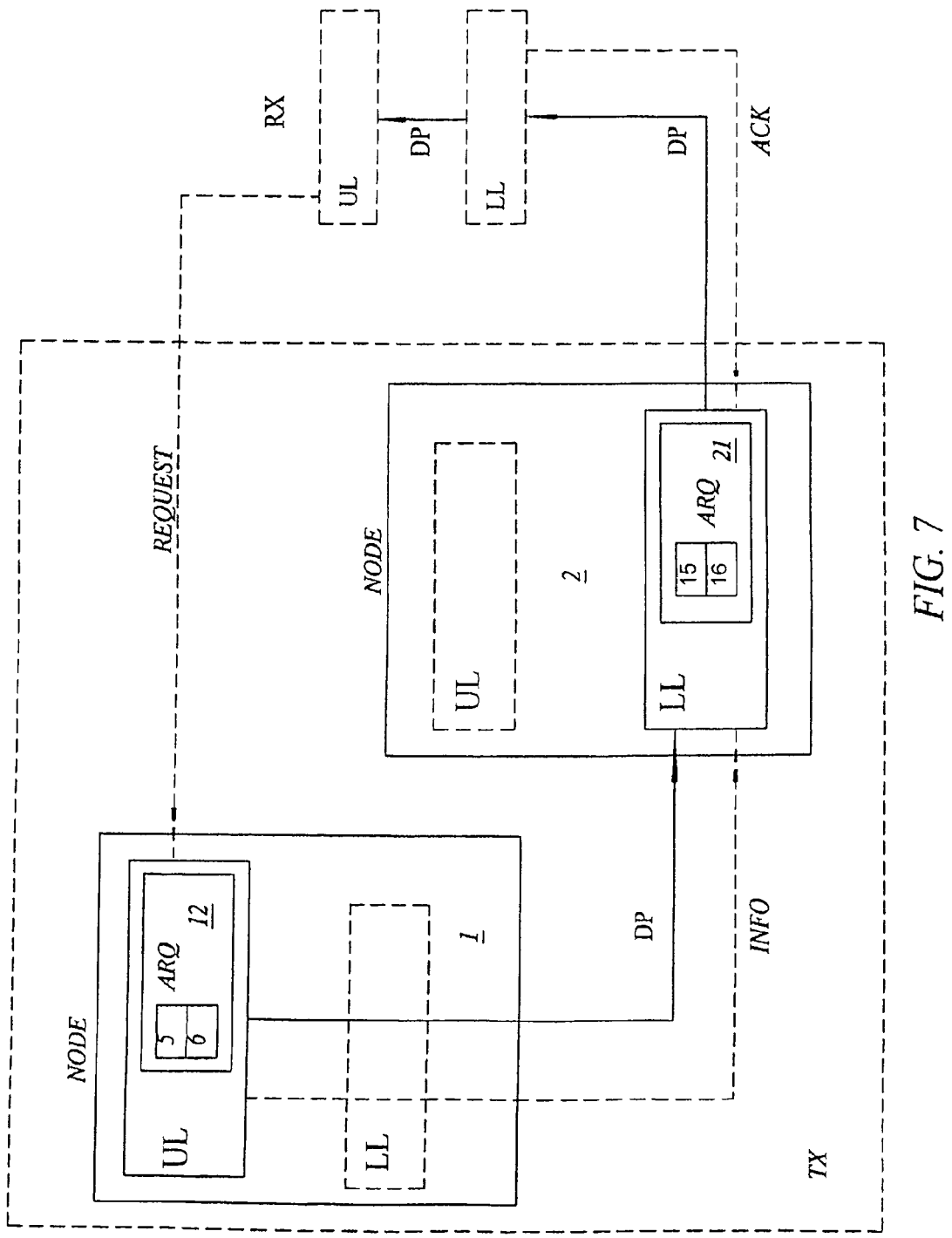
FIG. 7 is a schematic block diagram of an illustrative non-limiting embodiment.

FIG. 7 basically illustrates an illustrative non-limiting embodiment of an arrangement or system. The system comprises a plurality of network nodes 1, 2 each typically comprising at least an upper protocol layer UL and a lower protocol layer LL. In addition, a plurality of retransmission functional entities 12, 21 are located in at least two of said protocol layers of the nodes 1, 2. Also, the arrangement comprises means 5 and 15 respectively for exchanging some transmission state information between the retransmission functional entities 12, 21 in the different nodes 1, 2. Further, the arrangement comprises means 5 and 16 respectively adapted for inter-layer coordination of retransmissions between the network nodes 1, 2 based on the exchanged transmission state information. Additionally, an arbitrary network node with upper and lower protocol layers is indicated.

TX-Oriented Schemes:

Referring to FIG. 7, consider a non-limiting illustrative case of a transmitter-oriented scheme where a transmitter unit TX comprises a transmitting upper layer retransmission functional entity 12 in a first network node 1 reporting transmission state information to a transmitting lower layer retransmission functional entity 21 in a second network node 2. In this example, the upper layer UL of the first node 1 also retransmits sequentially numbered data units or data packets DP via the lower layer in the second node 2.

The data packets DP are transmitted and received at a receiving lower layer and finally end up in a receiving upper layer.

Figure 8:
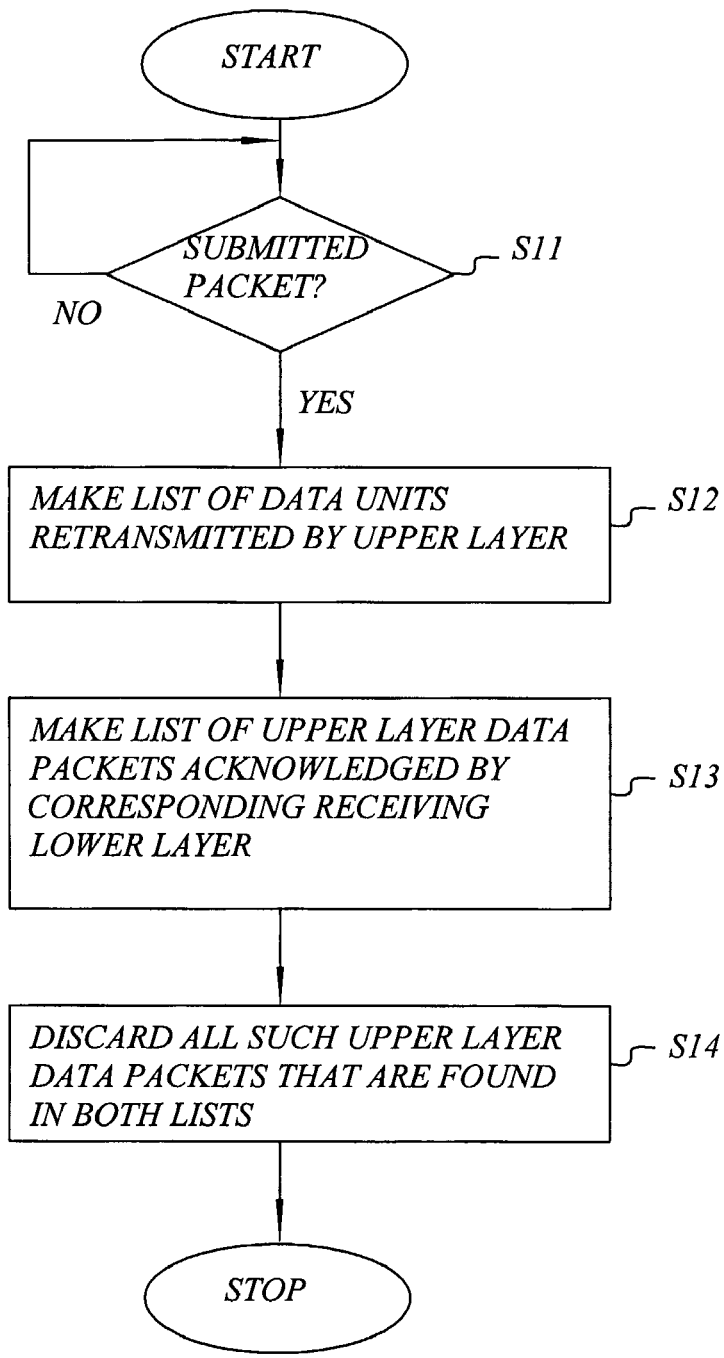
FIG. 8 is a schematic flow diagram of an illustrative non-limiting method utilized in FIG. 7.

An embodiment of a method for avoiding unnecessary retransmissions that can be utilized in FIG. 7 will be described referring to the flow diagram of FIG. 8. In this embodiment the transmitting lower layer retransmission functional entity 21 decides what data packets DP to retransmit.

The transmitting lower layer functional entity 21 transmits data packets DP to a receiving unit RX and awaits acknowledgment ACK of the data packets DP. At some point in time the transmitting upper layer retransmission functional entity 12 receives a request from a corresponding receiving upper layer for retransmission of a number of data packets. Consequently, the transmitting upper layer retransmission functional entity 12 submits (S11) the requested data packets to be retransmitted by the transmitting lower layer retransmission functional entity 21. In addition the transmitting upper layer retransmission functional entity 12 reports its transmission state information to the lower layer entity 21.

Subsequently, upon reception of the transmission state information regarding the retransmitted data packets the transmitting lower layer entity 21 compares the sequence numbers for the data packets to be retransmitted with the sequence numbers for data packets already acknowledged by the receiving unit. This can typically be achieved by preparing two lists (S12, S13) and comparing the lists.

In this case the transmission state information that is exchanged can be represented by a list of sequence numbers for retransmitted upper layer data units.

Based on said two lists, the transmitting lower layer retransmission functional entity can discard (S14) those data units that are already acknowledged by the receiving unit and only retransmit those data units not yet acknowledged. Thereby, only the lower layer entity retransmits missing data units.

Figure 9:
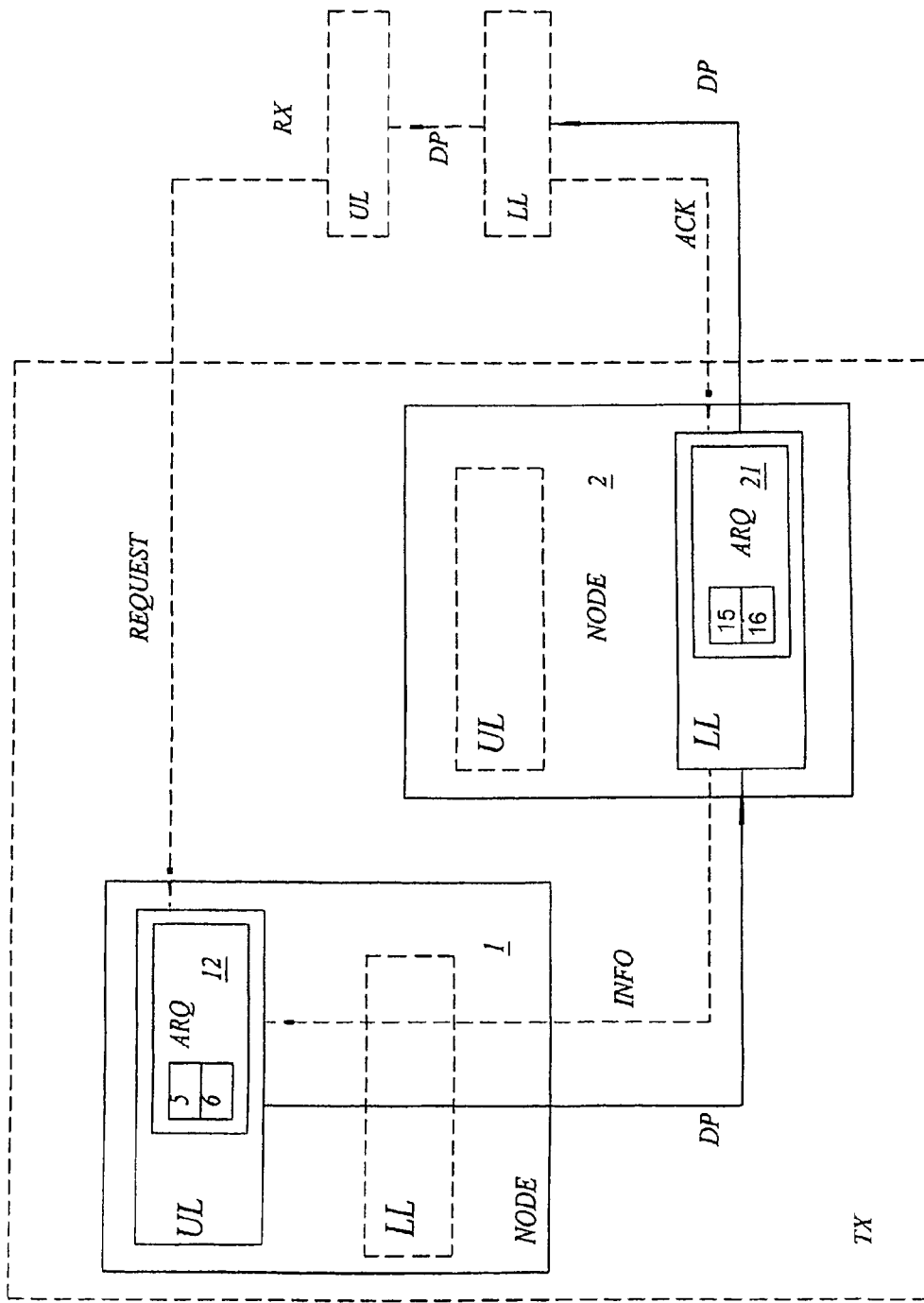
FIG. 9 is a schematic block diagram of another illustrative non-limiting embodiment.

Referring to FIG. 9, consider another non-limiting illustrative case of a transmitter-oriented scheme. The system illustrated in FIG. 9 is similar to the system illustrated in FIG. 7 and like elements (such as network nodes 1, 2, retransmission functional entities 12, 21, means 5, 6, 15, 16, etc.) perform similar functions. For example, the transmitting upper layer retransmission functional entity 12 in the first network node 1 receives transmission state information from the transmitting lower layer retransmission functional entity 21 in the second network node 2. In this example, the upper layer UL of the first node 1 also retransmits sequentially numbered data units DP via the lower layer LL in the second node 2. Like FIG. 7, the transmission state information are exchanged between the retransmission functional entities 12, 21 through the means 5 and 15 and inter-layer coordination of retransmission between the nodes 1 and 2 can be accomplished through the means 6 and 16.

Figure 10:
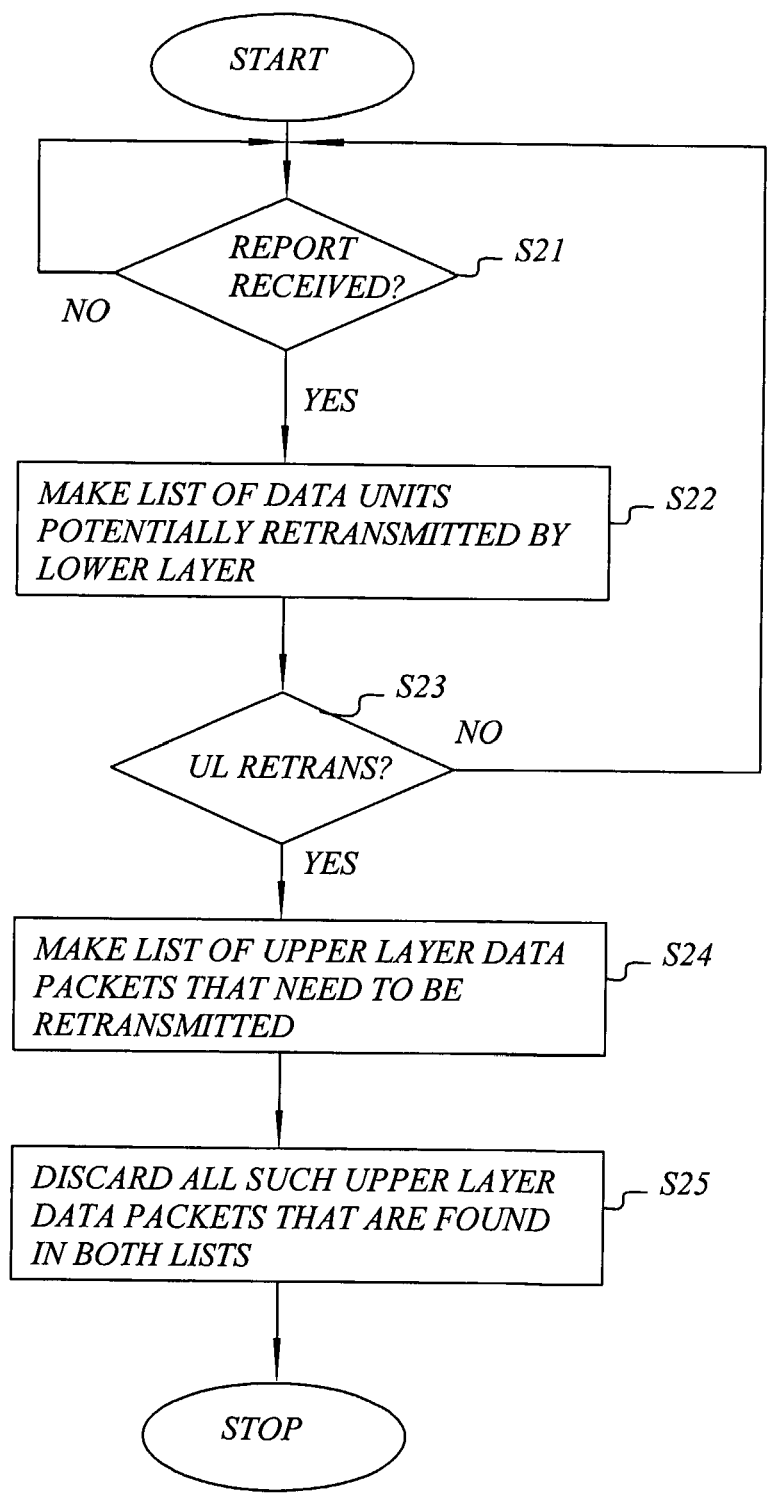
FIG. 10 is a schematic flow diagram of an illustrative non-limiting method utilized in FIG. 9.

An embodiment of a method for avoiding unnecessary retransmissions that can be utilized in FIG. 9 will be described referring to the flow diagram of FIG. 10. In this embodiment the transmitting upper layer retransmission functional entity 12 decides what data units to retransmit.

Similarly to the previous embodiment, data units or data packets DP, according to known measures, are transmitted, acknowledged or requested for retransmission. At some point in time, the transmitting lower layer retransmission functional entity 21 reports (S21) transmission state information to the upper layer entity 12. Preferably, the information comprises information of data units not yet acknowledged by the receiving unit RX.

The transmitting upper layer retransmission functional entity 12 receives the transmission state information from the lower layer entity 21 and prepares a list (S22) of data units potentially retransmitted by the lower layer. At the same time, the upper layer entity 12 receives a request (S23) for retransmission from a corresponding upper layer at the receiving unit RX. Preferably, the upper layer retransmission functional entity 12 prepares a second list (S24) comprising the sequence numbers of the data units requested for retransmission.

Subsequently, the upper layer entity 12 compares the information in the transmission state information and the request for retransmission, preferably by comparing two lists comprising the sequence numbers of the data units in each case.

Based on the received information the transmitting upper layer retransmission entity 12, decides if it is necessary with an upper layer retransmission. In that case, the sequence numbers that are present in both lists are discarded (S25) and are not retransmitted by the upper layer entity 12.

Figure 11:
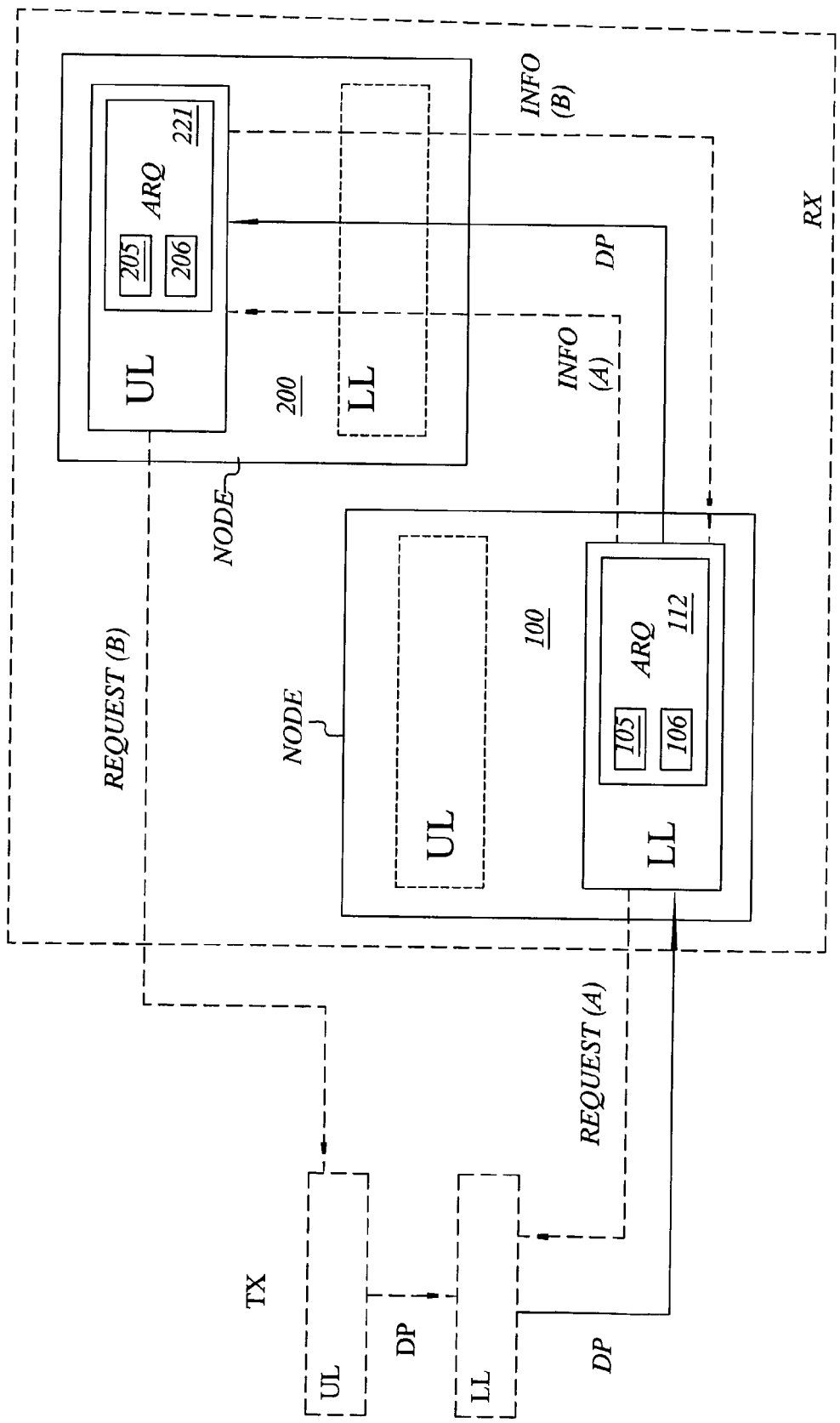
FIG. 11 is a schematic block diagram of another illustrative non-limiting embodiment.

RX-Oriented Scheme:

Non-limiting illustrative examples of receiver-based retransmission coordination will now be described with reference to FIG. 11 and FIG. 12. FIG. 11 shows a non-limiting illustrative arrangement or system and FIG. 12 is a flow diagram of a non-limiting illustrative method utilized in the system shown in FIG. 11.

FIG. 11, the system includes a plurality of network nodes 100 and 200. A lower layer retransmission functional entity 112 is located in a lower protocol layer LL at the first node 100, and an upper layer functional entity 221 is located in an upper protocol layer UL in the second node 200. The system also includes means 105, 205 for exchanging transmission state information between the retransmission functional entities 112, 221 in the different nodes 100, 200. The system further includes means 106, 206 adapted for inter-layer coordination of retransmissions between the network nodes 100, 200 based on the exchanged transmission state information. Additionally, an arbitrary network node with upper and lower protocol layers is indicated. In FIG. 11, the network nodes 100, 200 receive data packet transmissions from a transmitting unit TX.

Figure 12:
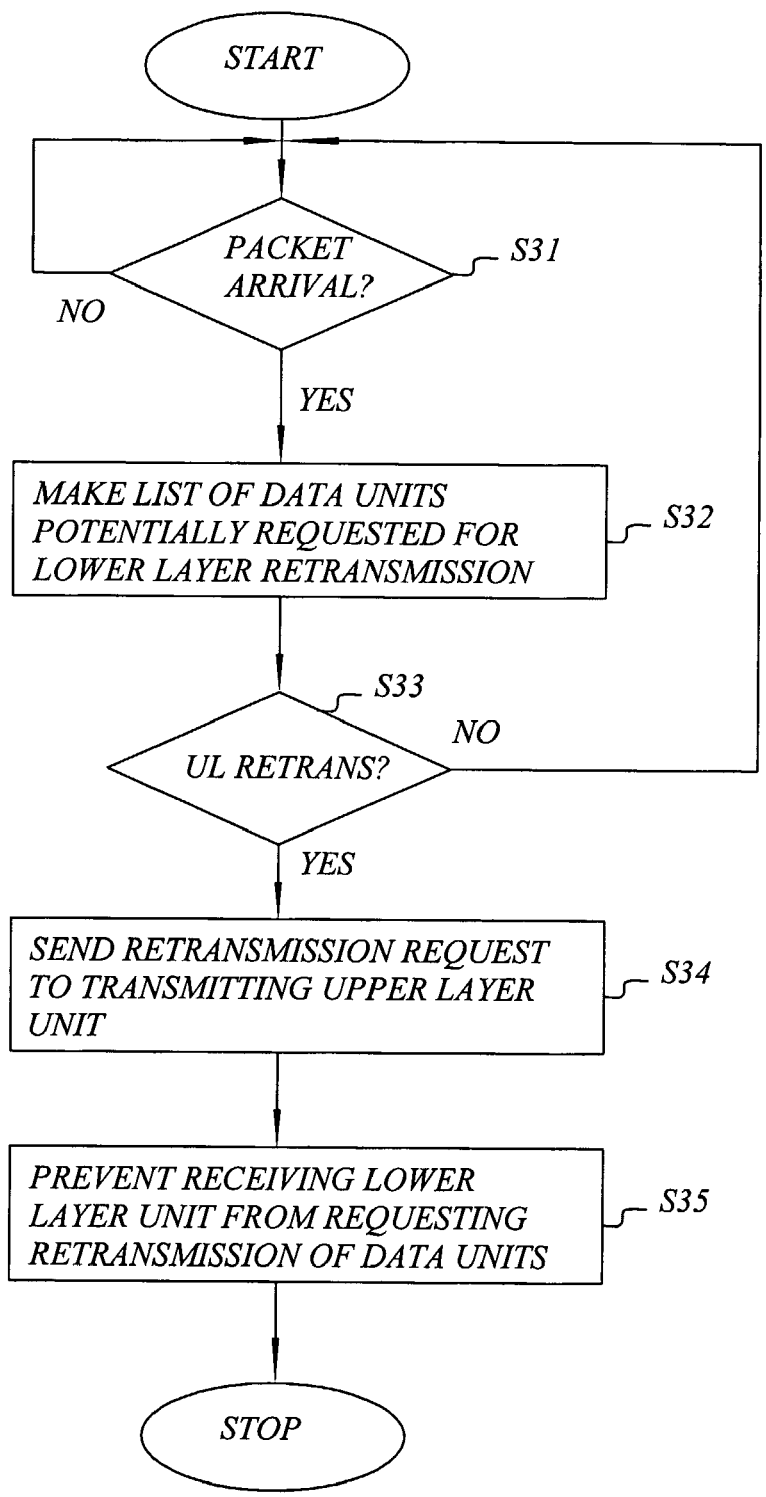
FIG. 12 is a schematic flow diagram of an illustrative non-limiting method utilized in FIG. 11.

According to the method shown in FIG. 12, the lower layer retransmission functional entity 112 reports its transmission state information together with received data units DP to the upper layer retransmission functional entity 211 (S31). Preferably, the transmission state information comprises sequence numbers for data units received and/or data units requested for retransmission by the lower layer entity 112.

The upper layer entity 221 typically prepares a list (S32) comprising the sequence numbers of data units requested for retransmission of the lower layer entity 112.

Consequently the upper layer entity 221 decides if an upper layer request for retransmission is necessary (S33). If so, the upper layer entity 221 sends a request (S34) for retransmission to a corresponding upper layer in the transmitting unit TX. At the same time the upper layer entity 221 reports transmission state information (S35) to the lower layer entity 112 to the effect that the lower layer entity 112 ceases to request for retransmission of data units.

According to another illustrative non-limiting embodiment of a receiver based coordination scheme, the upper layer entity 221 can decide that the lower layer entity 112 should request for retransmission. Consequently, the upper layer entity 221 reports transmission state information to the lower layer entity 112 to the effect that the lower layer entity 112 is forced to request for retransmission of data units.

A numerical exemplification of an illustrative non-limiting method will be described below with reference to FIG. 13.

EXAMPLE

Receiver-Orientated Inter-Layer Coordination

Figure 13:
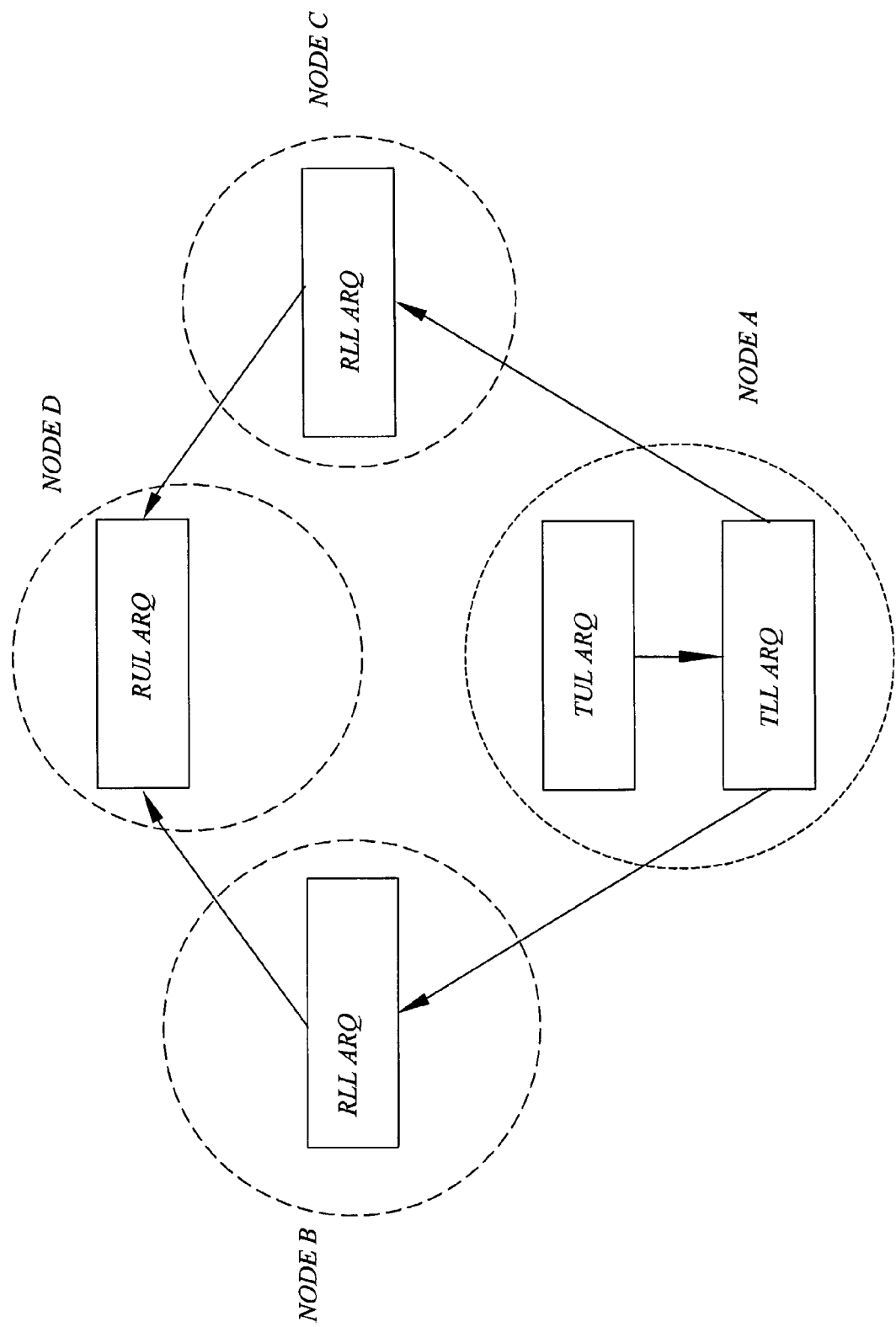
FIG. 13 is an illustration of a first illustrative non-limiting example of a small cellular network in which a numerical exemplification is utilized.

Let us consider a small cellular system with reference to FIG. 13. The system comprises one transmitting node A i.e. a mobile terminal or user equipment and two receiving nodes B, C i.e. base stations. Moreover, there are both transmitting upper layer and lower layer ARQ entities or retransmission functional entities in the transmitting node A and one receiving lower layer ARQ entity in each receiving node B, C. The receiving nodes B, C deliver data units to a radio network controller D through a transport network. The receiving upper layer ARQ entity is located in the network controller D.

Let us further consider a situation where the transmitting node A has sent sequentially numbered data packets or data units (1, 2, 3, 4, 5, 6, 7, and 8). Let us now assume that the first ARQ entity (in node B) has successfully received data units (1, 3, 4, and 8) and is therefore waiting for retransmissions of (2, 5, 6, 7). The lower layer ARQ scheme uses a window mechanism for representing the transmission state information, where the trailing edge of the window indicates the lowest sequence number of those data units that are requested for retransmissions and the leading edge of the window indicates the highest sequence number of the successfully received data units. In the following, the state of the ARQ window is denoted as (2, 8) where data unit (2) is the trailing edge and the data unit (8) is the leading edge of the window. Let us also assume that the second ARQ entity (in node C) has received (1,2,3,4,6,7) and its window state is given by (5,7).

Now, the first lower layer ARQ entity (in node B) delivers data unit (1) to the upper layer ARQ together with its transmission state information represented by its window state (2, 8). Similarly, the second lower layer ARQ entity (in node C) delivers data units (1, 2, 3, and 4) together with its transmission state information represented by its window state (5, 7) to the upper layer ARQ entity (in node D).

Up to this point, the receiving upper layer ARQ entity (in node D) has received data units (1, 2, 3, and 4) and it also knows that data unit (8) has been successfully received by a lower layer ARQ entity. The upper layer (in node D) now decides how those data units that are still missing should be retransmitted, based on the transmission state information provided by the lower layer ARQ entities.

If the upper layer ARQ entity (in node D) decides to request for retransmission of the missing data units then a non-limiting illustrative avoidance mechanism enforces the lower layer ARQ windows (both of them) to the state (8,8). This is interpreted by the lower layer ARQ entities in such a way that all data units up to the sequence number (8) are successfully received and no retransmissions are required. Thus, both ARQ entities give up all current requests for retransmissions of those data units that has a sequence number less than or equal to (8). Moreover, they also deliver all data units that have sequence numbers less than or equal to (8) to the upper layer ARQ entity in node D. In that case, the first lower layer ARQ entity (in node B) delivers data unit (8) and the second one (in node C) delivers data units (6) and (7). Consequently, the upper layer has received data units (1, 2, 3, 4, 6, 7, 8) while the data unit (5) is considered as lost. Now, an upper layer retransmission is (necessarily) triggered and it is also ensured that the lower layer entities are not requesting retransmissions of data unit (5) anymore.

If, on the other hand, the upper layer ARQ entity decides that the lower layers should request for retransmission of all the missing data units, the upper layer forces the trailing edge of both lower layer ARQ entities to (5) and the leading edge to (8). Thus, the ARQ window for the first lower layer ARQ entity becomes (5, 8) instead of (2, 8) and the second one becomes (5, 8) instead of (5, 7). Now, both lower layer entities will request for retransmissions of the missing data unit (5). It should be also noted that the first entity will not (unnecessarily) request for retransmissions of data unit (2) anymore. Also, the second entity will not (unnecessarily) request for retransmissions of data unit (8). It is now ensured that retransmission requests of missing data unit (5) is sent by the lower layer ARQ entities (both of them) and the upper layer ARQ entity cannot trigger any (unnecessary) retransmissions.

Another exemplification of an illustrative non-limiting method will be described below with reference to FIG. 14.

EXAMPLE

Transmitter-Orientated Inter-Layer Coordination

Figure 14:
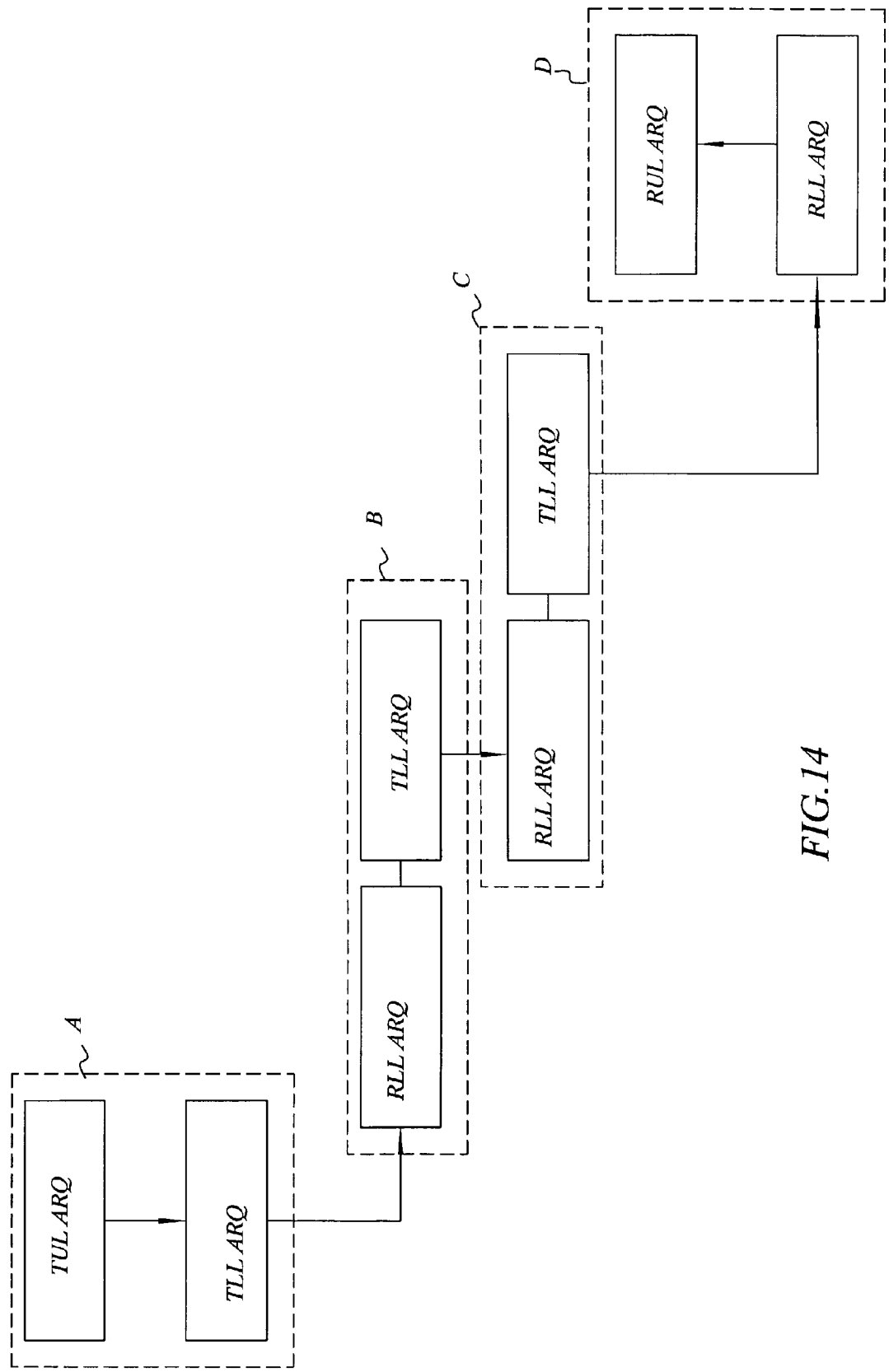
FIG. 14 is an illustration of a second illustrative non-limiting example of a multihop network in which a numerical exemplification is utilized.

Let us consider a small multi-hop radio network that is illustrated in the FIG. 14. The system comprises four independent nodes A, B, C and D, where A is the source node, B & C are relaying nodes and D is the destination node. Now, there are both transmitting upper layer and lower layer ARQ entities or retransmission entities in the source node A and both receiving upper layer and lower layer ARQ entities in the destination node D. Moreover, there is one receiving and one transmitting lower layer ARQ entity in each relaying node B, C.

Let us consider a situation where the source node A has transmitted data units (1, 2, 3, 4, 5, 6, 7, and 8). Let us further assume that the first relaying node B has successfully received data units (1, 2, 3, 4, 5, 6, and 8) from the transmitting node A. Let us also assume that the second relaying node C has received data units (3, 4, 5, 6, and 8) from the first relaying node B. Finally, the destination node D has received data units (5, 6, and 8) from the second relaying node C and it finds out that the data units (1, 2, 3, 4, and 7) are missing.

Now, the receiver transmission state information represented by the window of the first relaying node B is given by (7, 8) whereas the receiver windows of the second relaying node C and the destination node D are given by (1, 8).

Let us now assume that the transmitting upper layer ARQ entity in the source node A submits such upper layer protocol data units where the lower layer data units (1, 2, 3, and 4) belong to the lower layer. However, the final decision, whether or not an upper layer retransmission is necessary, is made by the transmitting lower layer ARQ entity based on the feedback that is received from the first relaying node B. In this case, the lower layer entity knows that the ARQ window of the first relaying node B is given by (7, 8), i.e. only the data unit (7) is missing, and therefore upper layer retransmission of data units (1, 2, 3, 4) from the source node A are considered as unnecessary.

Alternatively (and preferably) the transmitting lower layer ARQ entity in the destination node D reports its window state (7, 8) to the transmitting upper layer entity and thus the upper layer will not trigger retransmissions of (1, 2, 3, 4) at all In general, the retransmission functionality may be implemented as hardware, software, firmware or any suitable combination thereof, using for example microprocessor technology, digital signal processing or ASIC (Application Specific Integrated Circuit or other sub-micron technology. For example, the retransmission functionality may be implemented as software for execution by a computer system. The software may be written in almost any type of computer language, such as C, C++, Java or even specialized proprietary languages.

Although, the embodiment of an arrangement is described in the context of transmitting retransmission functional entities, it is equally possible to implement it with receiving entities as shown in FIG. 11.

The node 1 is a transmitting node, it is however implied that the node 1 can be a receiving node, according to FIG. 11.

According to the embodiment of FIG. 7, the retransmission functional entity 12 is located at a transmitting upper protocol layer UL. However, it is understood that the retransmission functional entity 12 can be located at transmitting lower protocol layers LL, or receiving upper or lower protocol layers.

It will be understood by those skilled in the art that various modifications and changes may be made to the present invention without departure from the scope thereof, which is defined by the appended claims.

The invention claimed is:

1. A method for avoiding unnecessary retransmissions in a packet-based radio communication system, said method comprising:
    exchanging transmission state information between upper transmitting and lower transmitting retransmission functional entities respectively located at first and second protocol layers respectively in first and second transmitting network nodes, said first and second nodes being different nodes;
    said lower transmitting retransmission functional entity receiving retransmitted data packets from said upper transmitting retransmission functional entity;
    said lower transmitting retransmission functional entity providing a first list comprising sequence numbers of data packets retransmitted by said upper transmitting retransmission functional entity;
    said lower transmitting retransmission functional entity providing a second list comprising sequence numbers of data packets acknowledged by a corresponding receiving lower receiving retransmission functional entity; and
    performing inter-layer coordination of retransmissions from said first and second protocol layers based on said exchanged transmission state information,
        whereby said upper and lower transmitting retransmission functional entities are prevented from retransmitting the same data packets, and
        said lower transmission retransmission functional entity retransmitting data packets not found in both said first and second lists,
    wherein said transmission state information relates to a status of reception and/or transmission of the data packets.

2. The method according to claim 1, further comprising exchanging said transmission state information between said first and second retransmission functional entities located at a same protocol layer.

3. The method according to claim 1,
    wherein said first and second protocol layers are respectively an upper protocol layer and a lower protocol layer, and
    wherein said transmission state information is exchanged between said first and second retransmission functional entities located at said respective upper protocol layer and lower protocol layer.

4. The method according to claim 3, wherein said upper and lower protocol layers are respectively transmitting upper and lower protocol layers, said method further comprising initiating said retransmissions from said second retransmission functional entity located at said transmitting lower protocol layer.

5. The method according to claim 1, wherein said step of exchanging said transmission state information comprises representing said transmission state information with a trailing edge and a leading edge of a sliding sequence number window.

6. The method according to claim 5, wherein said step of exchanging said transmission state information further comprises representing a state of said sliding window with a protocol primitive.

7. The method according to claim 5, wherein said step of representing said transmission state information with said trailing and leading edges comprises selecting the trailing edge to represent a lowest sequence number of data packets not yet received at a receiving retransmission functional entity, and the leading edge to represent a highest sequence number of data packets received.

8. The method according to claim 5, further comprising selecting the trailing edge to represent a lowest sequence number of data packets not yet acknowledged at a transmitting retransmission functional entity, and the leading edge to represent the highest sequence number of acknowledged data packets.

9. The method according to claim 1, wherein said first protocol layer and said second protocol layer are respectively a data link protocol layer and a transport protocol layer.

10. A method of operating a first transmitting node of a packet-based radio communication network, said first transmitting node arranged to implement a first transmission layer of a plurality of hierarchically arranged transmission protocol layers for transmission and retransmission of packets, said method comprising:

said first transmission layer receiving transmission state information from a second transmission layer of said plurality of transmission protocol layers, said second transmission layer being implemented on a second transmitting node of said network different from said first transmitting node, said transmission state information comprising information on packets cooperatively transmitted from said first and second transmission layers to a plurality of hierarchically arranged reception protocol layers implemented on one or more receiving nodes different from said first and second transmitting nodes; and said first transmission layer coordinating retransmission of packets based on said transmission state information such that said first and second transmission layers do not retransmit same packets to said reception protocol layers, wherein said first transmission layer is hierarchically below said second transmission layer such that said first and second transmission layers are respectively lower and upper transmission layers, method further comprising:

said lower transmission layer receiving submission from said upper transmission layer of a transmit list of packets for transmission to said reception protocol layers;

said lower transmission layer transmitting said transmit list of packets to a lower reception layer of said reception protocol, layers hierarchically corresponding to said lower transmission layer; and said lower transmission layer receiving acknowledgements from said lower reception layer, each acknowledgement indicating a receipt by said lower reception layer of a packet of said transmit list of packets, wherein said step of receiving said transmission state information comprises said lower transmission layer receiving a submission from said upper transmission layer of a retransmit list of data packets for retransmission to said plurality of reception protocol layers, wherein said step of coordinating retransmission of data packets comprises:

said lower transmission layer making acknowledge list of data packets for which acknowledgments have been received from said lower reception layer; and said lower transmission layer transmitting packets that are in said retransmit list and not in said acknowledge list, and wherein said transmission state information relates to a status of reception and/or transmission of the data packet.

11. A method of operating a first transmitting node of a packet-based radio communication network, said first transmitting node arranged to implement a first transmitting layer of a plurality of hierarchically arranged transmission protocol layers for transmission and retransmission of packets, said method comprising:

said first transmission layer receiving transmission state information from a second transmission layer of sail plurality of transmission protocol layers, and said second transmission layer being implemented on a second transmitting node of said network different from said first transmitting node, said transmission state information comprising information on packets cooperatively transmitted from said first and second transmission layers to plurality of hierarchically arranged reception protocol layers implemented on one or more receiving nodes different from said first and second transmitting nodes, and said first transmission layer coordinating retransmissions of packets based on said transmission state information such that said first and second transmission layers do not retransmit same packets to said reception protocol layers, wherein said first transmission layer is hierarchically above said second transmission layer such that said first and second transmission layers are respectively upper and lower transmission layers, said method further comprising:

said upper transmission layer determining a transmit list of packets for transmission to an upper reception layer of said reception protocol layers hierarchically corresponding to said upper transmission layer;

said upper transmission layer transmitting, via said lower transmission layer, said transmit list of packets to said upper reception layer; and said upper transmission receiving, via said lower transmission layer, acknowledgements from said upper reception layer, each acknowledgement indicating a receipt by said upper reception layer of a packet of said transmit list of packets, wherein said step of receiving said transmission state information comprises said upper transmission layer receiving from said lower transmission layer a no-acknowledge list of packets which comprises packets transmitted by said lower transmission layer to a hierarchically corresponding lower reception layer of said reception protocol layers and for which no acknowledgement has been received from said lower reception layer, wherein said step of coordinating retransmission of one or more data packets comprises:

said upper transmission layer making a first list of packets potentially retransmitted by said lower transmission layer based on said no-acknowledge list;

said upper transmission layer making a second list of packets for which acknowledgments have been received from said upper reception layer; and said upper transmission layer transmitting, via said lower transmission layer, packets of said transmit list that are not in both said first and second lists, and wherein said transmission state information relates to a status of reception and/or transmission of the data packets.

* * * * *

UNITED STATES PATENT AND TRADEMARK OFFICE
CERTIFICATE OF CORRECTION

| | |
|---|---|
| PATENT NO. | : 7,733,782 B2 |
| APPLICATION NO. | : 11/547494 |
| DATED | : June 8, 2010 |
| INVENTOR(S) | : Sunnell et al. |

It is certified that error appears in the above-identified patent and that said Letters Patent is hereby corrected as shown below:

On the Cover Page, item (12), under "UNITED STATES PATENT", in Column 1, Line 1, delete "Sunnell" and insert -- Sunell --, therefor.

On the Cover Page, item (75), under "Inventors", in Column 1, Line 1, delete "Karl-Erik Sunnell, Sollentuuna (SE);" and insert -- KaI-Erik Sunell, Bromma (SE); --, therefor.

On the Cover Page, item (56), under "OTHER PUBLICATIONS", in Column 2, Line 4, delete "PCTSE2004/000499." and insert -- PCT/SE2004/000499. --, therefor.

In Column 1, Line 6, delete "PCT/SE2004/090499" and insert -- PCT/SE2004/000499 --, therefor.

In Column 3, Line 48, delete "standard" and insert -- standard. --, therefor.

In Column 5, Line 25, delete "network" and insert -- network, --, therefor.

In Column 8, Line 42, delete "TOP" and insert -- TCP --, therefor.

In Column 11, Line 8, before "FIG. 11," insert -- In --.

In Column 14, Line 33, in Claim 1, delete "transmission" and insert -- transmitting --, therefor.

In Column 15, Line 41, in Claim 10, after "layers," insert -- said --.

In Column 15, Line 43, in Claim 10, after "receiving" insert -- a --.

In Column 15, Line 48, in Claim 10, delete "protocol," and insert -- protocol --, therefor.

In Column 15, Line 61, in Claim 10, after "making" insert -- an --.

Signed and Sealed this
Twenty-second Day of February, 2011

David J. Kappos
*Director of the United States Patent and Trademark Office*

In Column 16, Line 3, in Claim 10, delete "packet." and insert -- packets. --, therefor.

In Column 16, Line 11, in Claim 11, delete "sail" and insert -- said --, therefor.